Aug. 6, 1957 — O. G. SCHWEDE — 2,802,112
RADIATION METER DEVICE
Filed Dec. 9, 1953 — 2 Sheets-Sheet 1

INVENTOR
OTTO G. SCHWEDE
ATTORNEYS

Aug. 6, 1957  O. G. SCHWEDE  2,802,112
RADIATION METER DEVICE
Filed Dec. 9, 1953  2 Sheets-Sheet 2

INVENTOR
OTTO G. SCHWEDE

BY
ATTORNEYS

United States Patent Office 2,802,112
Patented Aug. 6, 1957

2,802,112

RADIATION METER DEVICE

Otto G. Schwede, Ventura, Calif.

Application December 9, 1953, Serial No. 397,275

10 Claims. (Cl. 250—83.3)

(Granted under Title 35, U. S. Code (1952), sec. 266)

The invention described herein may be manufactured and used by or for the Government of the United States of America for governmental purposes without the payment of any royalties thereon or therefor.

The present invention relates to a radiation meter device and more particularly to a radiation meter device utilizing an electrometer radiation indicating means and a time indicating means which moves at a predetermined rate, the two indicating means cooperating to give a quick and reliable visual indication whether or not dangerous radiation is present.

The present invention concerns portable radiation meters adapted to be carried about by a person to measure radiation intensity and avoid overexposure. Since the development of atomic energy, the need has arisen for a simple and inexpensive meter which will provide scientists and technicians who work in the vicinity of radioactive substances with a quick and reliable indication of the intensity of any radioactive radiations to which they may be exposed. Furthermore, in the event of an atomic war, such meters will be required in large numbers for civilians and military personnel who may be exposed to radiation subsequent to the explosion of an atomic bomb or the like. Since there is the possibility that subsequent to an atomic disaster no batteries will be available and that there will be a failure of electric power, radiation meter devices have been developed which are self-contained, requiring no external source of power. Such devices utilize an electrometer radiation indicating means which is charged by static electricity produced by a miniature influence machine or other suitable means such as highly polished beads in a metal container. A radiation meter device employing a self-contained influence machine is shown for instance in U. S. Patent No. 2,577,253.

In self-contained radiation meters, the initial charge on the electrometer means is quite variable, and therefore time consuming calculations must be made each time the device is used to determine the intensity and amount of radiation to which the device and the user have been exposed. This is very dangerous since a person may be seriously injured by radioactive radiations before he is aware of the fact that the radiations are above the safety level for human exposure. It is therefore desirable to provide a means which gives a quick, reliable visual indication of the radiation intensity without the necessity of any calculations regardless of the initial charge on the electrometer means.

The invention device employs an electrometer radiation indicating means which is charged by a self-contained influence machine. A timing mechanism which moves at a predetermined rate is provided with a means for selectively actuating the mechanism and simultaneously adjusting the initial position of a timing indicator in accordance with the initial position of the charge indicator of the electrometer means. These two indicators cooperate to give a quick and reliable visual indication of the radiation intensity thereby eliminating any necessity of time consuming calculations to determine whether or not the radiations are above or below a critical level.

An object of the present invention is the provision of a new and novel radiation meter device which gives a quick and reliable visual indication of radiation intensity.

Another object is to provide a new and novel radiation meter device which is simple and inexpensive in construction, yet rugged and reliable in operation.

Other objects and many of the attendant advantages of this invention will be readily appreciated as the same becomes better understood by reference to the following detailed description when considered in connection with the accompanying drawings wherein.

Figure 1:
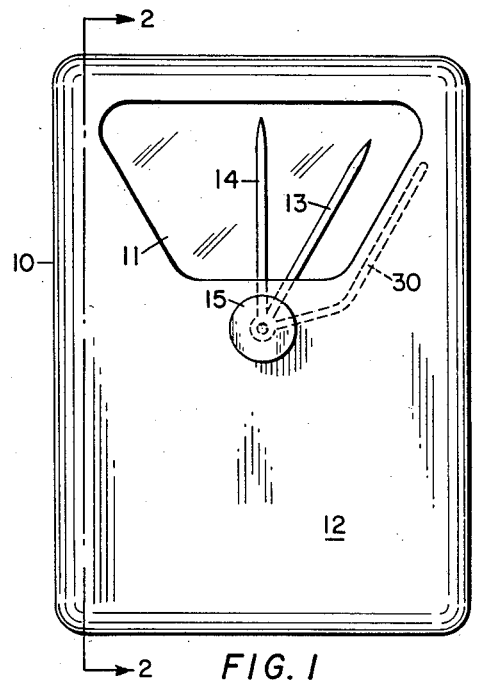
Fig. 1 is an elevation of a preferred embodiment of the invention.

Referring now to the drawings, wherein like reference characters designate like or corresponding parts throughout the several views, there is shown in Fig. 1 a housing or body member 10 composed of an electrically conductive material which freely passes radioactive radiation such as aluminum or a synthetic resin having a thin layer of copper or the like thereon. A transparent window 11 formed of glass or the like is mounted in the front wall 12 of the housing, a charge needle or indicator 13 and a timing needle or indicator 14 being visible through the window. A knurled knob 15 which is adapted to adjust the position of needle 14 is positioned exteriorly of the housing whereby it may be manually actuated. As more clearly seen in Fig. 2, the housing has an enclosed cavity 16 formed therein, and a partition 17 formed integral with the housing divides the cavity into two enclosed chambers 18 and 19. The housing is hermetically sealed, a gas such as air being disposed within the cavity, and a suitable desiccant such as lime or the like may also be disposed within chamber 18 which contains the electrometer means of the device. Windows 20 and 21 similar to window 11 are respectively mounted in partition 17 and rear wall 22 of the housing, all three windows being in axial alignment whereby needles 13 and 14 are clearly visible from either end of the housing.

Figure 3:
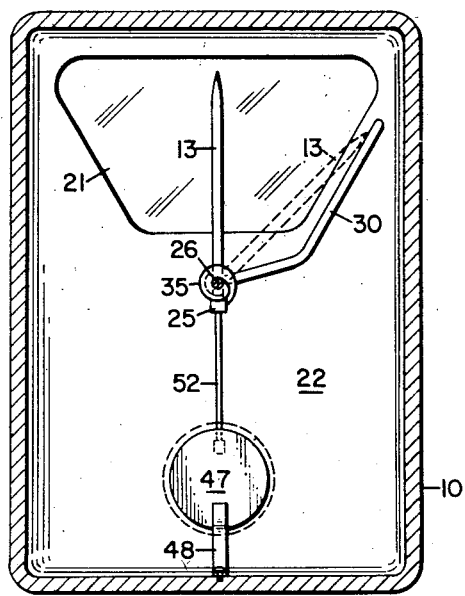
Fig. 3 is a fragmentary sectional view taken on the line 3—3 of Fig. 2 looking in the direction of the arrows.

Needle 13 of the electrometer means is provided with a small counterweight 25 and is fixed to a shaft 26 formed of electrically conductive material such as steel or the like, the shaft being rotatably journaled at its opposite end portions in metallic bearings 27, 27' supported within insulating portions 28 and 29 which are respectively mounted in walls 17 and 22. Needle 13 serves as the movable electrode of the electrometer means and a fixed electrode or arm 30 is secured to the outer periphery of bearing 27' whereby electrodes 13 and 30 are electrically connected at all times. As more clearly seen in Fig. 3, electrode 30 is bent upwardly such that it is aligned with one side of windows 20 and 21, and electrode 13 is adapted to pivot toward and away from the fixed electrode. A spiral spring 35 has one end fixed to shaft 26 and the opposite end suitably secured to portion 28 whereby the shaft and needle 13 are urged in a clockwise direction as seen in Fig. 3, such that electrode 13 moves toward electrode 30 under the influence of the spring, and the electrodes are adapted to engage one another when the device is completely discharged.

Referring again to Fig. 2, a charging unit 40 includes a shaft 41 rotatably journaled in a bearing block 42 formed of electrically conductive material such as copper or the like. Block 42 is secured to wall 22 by means of screws 43 and a sealing ring 44 is mounted within a recess in the block such that an air tight fit is formed between the sealing ring and the outer periphery of the shaft. A knurled knob 45 is fixed to the outer end of shaft 41 and knob 45 lies within a recessed portion 46 formed in wall 22 when shaft 41 is in its inner position shown in Fig. 2. A charging wheel 47 formed of suitable dielectric material such as glass or the like is secured to the inner end of the shaft, and a spring contact 48 is fixed to lower wall 49 of the housing whereby the charging wheel is adapted to engage contact 48 when shaft 41 is in its inner position. A spring contact 50 is supported by insulating portion 51 which is fixed to the upper portion of block 42, and contact 50 is electrically connected to member 27' by means of lead 52. A friction member 53 formed of a suitable friction material such as felt or the like is secured to the lower portion of block 42, and member 53 extends through an arc of approximately 120 degrees, the arc being coextensive with the outer periphery of wheel 47. It is apparent that when shaft 41 is moved to its outer position as indicated by the phantom lines in Fig. 2, wheel 47 engages contact 50 and friction member 53. Although shaft 41 is rotatably journaled in block 42 and wall 22, sufficient friction is present such that shaft 41 will remain in its inner or outer position until manually urged in the other direction.

Figure 2:
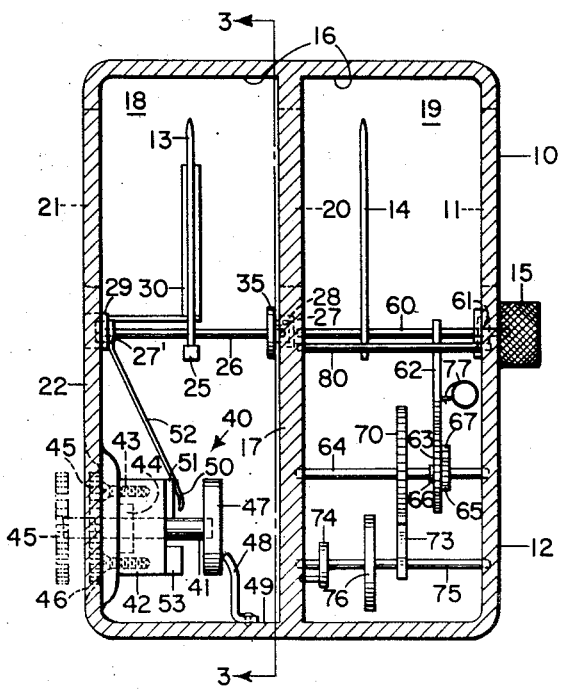
Fig. 2 illustrates a longitudinal section of the device taken on the line 2—2 of Fig. 1 looking in the direction of the arrows, the charge needle of the device being in a vertical position.
Figure 4:
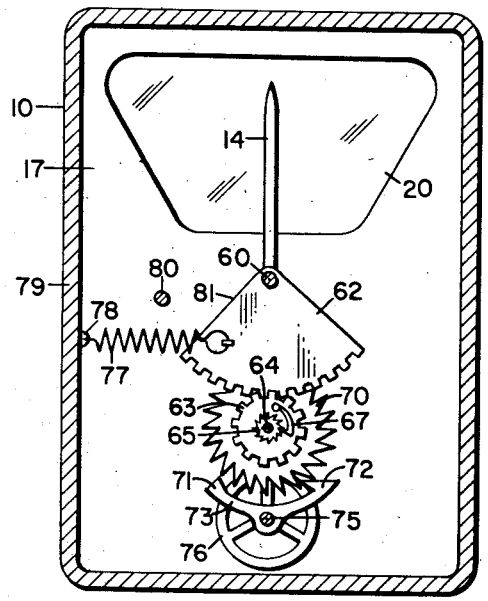
Fig. 4 shows the device of Fig. 1 with the front wall removed.

Referring now to Figs. 2 and 4 there is shown the timing means of the device which includes a shaft 60 which is journaled at its opposite ends in walls 12 and 17, knob 15 being fixed to the outer end of the shaft which extends exteriorly of the casing. A sealing ring 61 forms an air tight fit with the outer periphery of the shaft, and needle 14 is fixed to an intermediate portion of the shaft. A gear segment 62 is fixed to shaft 60 and meshes with a gear 63 which is rotatably mounted on a shaft 64 journaled at its opposite ends in walls 12 and 17. A ratchet wheel 65 is fixed to shaft 64 and is positioned adjacent gear 63, a small shoulder 66 being provided on the shaft for preventing axial movement of gear 63. A leaf spring ratchet 67 is fixed to gear 63 and the natural resiliency of the ratchet urges it into engagement with the ratchet wheel such that as viewed in Fig. 4, the ratchet wheel rotates with gear 63 when the gear moves counterclockwise, but the ratchet will not cause rotation of wheel 65 when the gear moves clockwise.

A conventional escapement wheel 70 is fixed to shaft 64 and engages pallets 71 and 72 which are formed at the opposite ends of a conventional pendulum member 73. The pendulum member is fixed to shaft 75 which is journaled at its opposite ends in walls 12 and 17, and a balance wheel 76 is also secured to shaft 75. A light spiral spring 74 has one end fixed to shaft 75 and the opposite end suitably secured to wall 17, the spring cooperating with the balance wheel to determine the periodic time of the oscillations of the pendulum member.

A tension spring 77 is secured at one end to a bracket 78 fixed to side wall 79 of the housing and is secured at its other end to gear segment 62 whereby the gear segment is urged in a clockwise direction as viewed in Fig. 4. A bar 80 which is secured at its opposite ends in walls 12 and 17 is adapted to engage lateral portion 81 of member 62 to prevent excessive movement of the gear segment and needle 14 under the influence of spring 77. The timing mechanism is adapted to move needle 14 in a clockwise direction as viewed in Fig. 4 at a predetermined rate, and this rate may be adjusted by suitably choosing the proper size and dimensions for members 70, 73, and 76 in a well-known manner.

The operation of the device shown in Figs. 1–4 is as follows:

When the device is totally discharged, needle 13 is urged by spring 35 into the dotted line position shown in Fig. 3, and shaft 41 is normally at its inner position as shown in Fig. 2. When it is desired to charge the device, knob 45 is drawn outwardly into the phantom line position shown in Fig. 2 whereupon wheel 47 engages contact 50 and friction member 53. Knob 45 is then rotated causing a static charge to be generated on the surface of the charging wheel by reason of its contact with the friction member 53. The static charge is drained from the charging wheel by contact 50 and such charge is conducted through lead 52 and member 27' to the electrodes whereupon movable electrode 13 is repelled from the fixed electrode 30 and moves to some intermediate position as shown in full lines in Fig. 3. Upon completion of the charging operation, knob 45 is again returned to its position in recess 46 of wall 22, as shown in Fig. 2, carrying shaft 41 inwardly, disengaging wheel 47 from contact 50 and member 53, and engaging the charging wheel with contact 48 whereby the wheel is grounded to the casing. The force of spring 35 is so selected that a given amount of movement of needle 13 indicates a predetermined amount of radiation.

As soon as the electrometer means has been charged, knob 15 is grasped, and viewing the device as shown in Fig. 1, needle 14 is moved to a position such that it is aligned with needle 13. As needle 14 is rotated counterclockwise into alignment with needle 13, spring 77 is simultaneously tensioned, and upon release of the knob, needle 14 is rotated clockwise at a predetermined rate by the spring, the rate being determined by the timing mechanism. If radiation is present, needle 13 also moves clockwise under the influence of spring 35. The rate at which needle 14 moves is selected such that if needle 13 moves faster than needle 14 in a clockwise direction, the intensity of radiation exceeds the safety level for human exposure. It is therefore apparent that once the device has been charged and needle 14 placed in alignment with needle 13, it is merely necessary thereafter to glance at the device and if needle 13 has advanced farther in a counterclockwise direction than needle 14, dangerous radiation is present and the user should move to another area.

Figure 5:
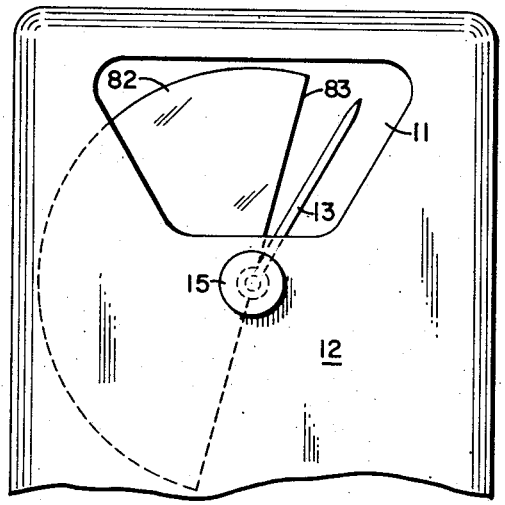
Fig. 5 illustrates a modification of the device of Figs. 1 to 4.

Fig. 5 shows a modification of the device wherein needle 14 has been replaced by an opaque semi-circular disc 82, the remaining components of the device being the same as the device shown in Figs. 1–4. Lateral portion 83 is aligned with needle 13 when the device is initially charged, and dangerous radiation is thereby strikingly indicated since needle 13 is only visible from the front of the casing when needle 13 has advanced farther in a counterclockwise direction than the disc, due to an excessive intensity of radiation. It is evident that the outer periphery of member 82 may also define an arc of less than 180 degrees, if desired.

Figure 6:
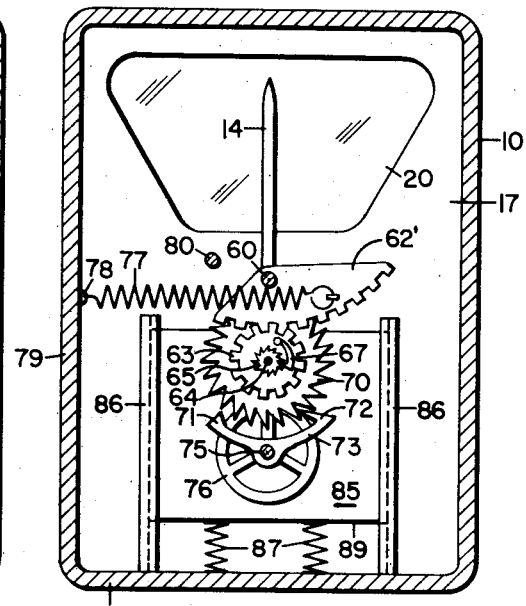
Fig. 6 shows another modification of the invention device.

Fig. 6 illustrates another modification of the device of Figs. 1 to 4 wherein segment 62 thereof has been replaced by a gear segment 62' of a different configuration to compensate for the nonlinear characteristics of the electrometer used therewith. It is apparent that gear segment 62' may be of various other configurations in accordance with the characteristics of the electrometer used in the particular device. However, since the gear segment is no longer symmetrical as in the device shown in Figs. 1–4, provision must be made such that the gear segment and gear wheel 63 will be in proper engagement at all times. To accomplish this, shafts 64 and 75 of the timing mechanism are mounted between two oppositely facing plates 85, only one of which is shown, each of the plates being slidably mounted in a pair of tracks 86 secured to walls 12 and 17 respectively of the housing. Two springs 87 are mounted between the lower wall 88 of the housing and the lower surface 89 of each of the plates whereby the plates and the associated timing mechanism are urged in an upward direction, thereby insuring engagement of gear segment 62 and gear 63 at all times. The components of the timing mechanism which are mounted on shafts 64, 75 and the operation thereof are identical with those of the device shown in Figs. 1–4. It is apparent that as gear segment 62′ moves in a clockwise direction under the influence of spring 77, plates 85 and the associated timing mechanism are adapted to move in a downward direction since spring 77 is sufficiently stronger than springs 87 to cause such action. In designing the timing mechanism of the device shown in Fig. 6, the additional force required to compress springs 87 must of course be considered to obtain the correct rate of movement of needle 14.

While housing 10 has been shown as being preferably divided into two enclosed chambers, it should be understood that the chambers may be in communication to permit the gas therein to circulate and that the electrometer means and the timing means may both be disposed within a single enclosed chamber if desired.

It is apparent from the foregoing that there is provided a new and novel radiation meter device which gives a quick and reliable visual indication of radiation intensity without the necessity of any time consuming calculations, and that the device is simple and inexpensive in construction, yet rugged and reliable in operation.

Obviously many modifications and variations of the present invention are possible in the light of the above teachings. It is therefore to be understood that within the scope of the appended claims the invention may be practiced otherwise than as specifically described.

I claim:

1. A radiation meter device which comprises a housing having a cavity formed therein, first indicating means disposed within said cavity for continuously indicating the amount of radiation to which the device has been exposed, means for charging said first indicating means, second indicating means disposed within said cavity, means for adjusting the initial position of said second indicating means in substantial alignment with said first indicating means, and means for moving said second indicating means in the same direction as said first indicating means and at a predetermined rate which is coordinated with the rate of movement of said first indicating means at a predetermined intensity of radiation, whereby said first and second indicating means cooperate to indicate whether the radiation intensity has exceeded a critical value.

2. A radiation meter device which comprises a hollow housing, a static electrometer means disposed within said housing and including a first pivotally mounted indicator, means for charging said electrometer means, timing means disposed within said housing and including a second pivotally mounted indicator, said first and second indicators being independently pivoted about the same geometrical axis, and means for actuating said timing means and cooperatively adjusting the initial position of said second indicator relative to said first indicator so that both indicators will have a coordinated rate of movement in the same direction at a predetermined intensity of radiation.

3. A device as defined in claim 2 wherein said timing means is supported between a plurality of plates which are slidably mounted within said housing.

4. A radiation meter device which comprises a housing having an enclosed cavity formed therein, said housing being adapted to freely pass radiations, means mounted in said housing for viewing the interior thereof, electrometer means disposed within said cavity and including a movable electrode adapted to continuously indicate the amount of radiation to which the device has been exposed, means disposed within said cavity for selectively charging said electrometer means, a timing indicator disposed within said cavity adjacent said electrode, timing means disposed within said cavity for moving said indicator at a predetermined rate, and means positioned exteriorly of said housing for selectively actuating said timing means and cooperatively adjusting the initial position of said indicator relative to said movable electrode, following which actuation and adjustment both said indicator and said electrode will move in the same direction and at substantially the same rate at a predetermined intensity of radiation received by said meter.

5. A device as defined in claim 4 wherein said movable electrode and said timing indicator are independently pivotally mounted about the same geometrical axis.

6. A device as defined in claim 5 wherein said timing indicator comprises a substantially semi-circular plate.

7. A radiation meter device which comprises a hermetically sealed housing formed of electrically conductive material and having two enclosed chambers formed therein, means mounted in said housing for viewing the interior of each of said chambers, electrometer means disposed within one of said chambers and including an electrode fixed to a first shaft, said first shaft being rotatably journaled in a support means which is electrically insulated from said housing, means disposed within said one chamber for selectively charging said electrometer means, timing means disposed within another of said chambers and including an indicator fixed to a second shaft which is rotatably journaled in said housing, the longitudinal axes of said first and second shafts being in axial alignment, and means disposed exteriorly of said housing and connected to said second shaft for selectively actuating said timing means and cooperatively adjusting the initial position of said indicator relative to said electrode, following which actuation and adjustment both said indicator and said electrode will move in the same direction and at substantially the same rate at a predetermined intensity of radiation received by said meter.

8. A device as defined in claim 7 wherein said timing means includes a gear segment fixed to said second shaft, spring means urging said gear segment in one direction, a third shaft having a gear rotatably mounted thereon, said gear being in meshing engagement with said gear segment, a one-way drive means connecting said gear and said third shaft, an escapement wheel fixed to said third shaft, a fourth shaft, a pendulum means fixed to said fourth shaft and adapted to engage said escapement wheel, and a balance wheel fixed to said fourth shaft.

9. A radiation meter device which comprises a hermetically sealed housing formed of electrically conductive material and being adapted to freely pass radiations, an enclosed cavity formed in said housing and a partition formed integral with said housing whereby said cavity is divided into two enclosed chambers, transparent window means mounted in opposite walls of said housing and in said partition, electrometer means disposed within one of said chambers and including a movable electrode, said electrode being pivotally supported by a support means which is electrically insulated from said housing, means disposed within said one chamber and adapted to selectively create static electrical charges for charging said electrometer means, timing means disposed within another of said chambers and including a pivotally mounted indicator, said movable electrode and said indicator being adapted to pivotally move about the same geometrical axis, means disposed exteriorly of said housing for selectively actuating said timing means and cooperatively adjusting the initial position of said indicator relative to said electrode, a gear segment drivingly connected to said indicator, spring means having one end connected to said housing and the opposite end connected to said gear segment, a first shaft rotatably journaled in said housing, a gear wheel rotatably journaled on said first shaft, a ratchet wheel fixed to said first shaft, a resilient ratchet fixed to said gear wheel and adapted to engage said ratchet wheel, an escapement wheel fixed to said first shaft, a second shaft rotatably journaled in said housing, a pendulum member fixed to said second shaft and having a plurality of pallets adapted to engage said escapement wheel, and a balance wheel fixed to said second shaft, such that following the actuation of said timing means and the adjustment of said indicator, said indicator and said electrode will both move in the same direction and at the same rate at a predetermined intensity of radiation received by said meter.

10. A radiation meter device which comprises an enclosed housing formed of a material adapted to freely pass radioactive radiations, means mounted on said housing for viewing the interior thereof, a first rotatable shaft mounted within said housing and electrically insulated therefrom, a first electrode in the form of a pointer mounted on said shaft for rotation thereby, a fixed second electrode electrically connected to said shaft, a second rotatable shaft mounted within said housing and having limited longitudinal movement, a charging wheel fixed to said second shaft for rotation thereby, means for imparting static electrical charges to said charge wheel when said wheel is rotated in contact with said last named means, said wheel being separated from said means on longitudinal movement of said second shaft, a member for transferring said static charges from said charge wheel to said first and second electrodes, a third shaft mounted for rotation within said housing on the same geometrical axis as said first shaft, an indicator fixed to said third shaft for rotatable movement to a position relative to said first electrode, timing means for rotating said third shaft at a predetermined rate, and means disposed exteriorly of said housing for selectively actuating said timing means and cooperatively adjusting the position of said indicator to bring same into alignment with said first electrode, following which actuation and adjustment said timing means will move said indicator in the same direction and at the same rate as that at which said first electrode moves when radiation of a predetermined intensity is received by said meter.

References Cited in the file of this patent

UNITED STATES PATENTS

| 2,104,378 | Pychlau | Jan. 4, 1938 |
| 2,168,464 | Yeda | Aug. 8, 1939 |
| 2,189,623 | Bourland | Feb. 6, 1940 |
| 2,594,660 | Lauritsen | Apr. 29, 1952 |

FOREIGN PATENTS

| 923,573 | France | Feb. 24, 1947 |